(12) United States Patent
Sullivan et al.

(10) Patent No.: US 7,505,485 B2
(45) Date of Patent: Mar. 17, 2009

(54) METHODS AND SYSTEMS FOR START CODE EMULATION PREVENTION AND DATA STUFFING

(75) Inventors: Gary J. Sullivan, Redmond, WA (US); Stephen J. Estrop, Carnation, WA (US)

(73) Assignee: Microsoft Corporation, Redmond, WA (US)

( * ) Notice: Subject to any disclaimer, the term of this patent is extended or adjusted under 35 U.S.C. 154(b) by 1050 days.

(21) Appl. No.: 10/350,273

(22) Filed: Jan. 22, 2003

(65) Prior Publication Data

US 2003/0146855 A1 Aug. 7, 2003

Related U.S. Application Data

(60) Provisional application No. 60/351,143, filed on Jan. 22, 2002.

(51) Int. Cl.
*H04J 3/24* (2006.01)
(52) U.S. Cl. .................. 370/474; 370/475; 370/476; 370/504; 370/506; 370/508; 370/511; 370/513; 370/514
(58) Field of Classification Search .......... 370/474–476, 370/503–514
See application file for complete search history.

(56) References Cited

U.S. PATENT DOCUMENTS

| | | | |
|---|---|---|---|
| 4,847,877 A | 7/1989 | Besseyre | |
| 4,982,270 A | 1/1991 | Tanaka et al. | |
| 5,606,539 A | 2/1997 | De Haan et al. | |
| 5,608,697 A | 3/1997 | De Haan et al. | |
| 5,650,825 A * | 7/1997 | Naimpally et al. | 348/465 |

(Continued)

FOREIGN PATENT DOCUMENTS

EP    0 886 398 A1    12/1998

(Continued)

OTHER PUBLICATIONS

Pennebaker et al., JPEG Still Image Data Compression Standard, pp. 105-106 (1993).

(Continued)

*Primary Examiner*—Aung S Moe
*Assistant Examiner*—Christopher P Grey
(74) *Attorney, Agent, or Firm*—Klarquist Sparkman, LLP (57) ABSTRACT

Methods and systems provide approaches to start code emulation prevention at a granularity higher than the bit level. By operating at a level other than the bit level, processing capability requirements on both the encoder and decoder side can be reduced. In accordance with one or more embodiments, a start code emulation prevention method looks for data patterns relative to fixed-size data portions larger than single bits. When a particular pattern is found, start code emulation prevention data is inserted to prevent start code emulation. The inserted data is larger than a single bit and, in some embodiments, comprises a byte. When a decoder decodes data that has had start code emulation prevention data inserted, it can easily identify legitimate start codes and then can remove the start code emulation prevention data to provide the original data that was protected. In addition, a data stuffing method is described which allows payload data to be rounded up in size to an integer number of byte sizes, and then allows filler data to be added in a manner which is easily detectable by a decoder.

37 Claims, 3 Drawing Sheets

U.S. PATENT DOCUMENTS

| | | | |
|---|---|---|---|
| 5,661,665 | A | 8/1997 | Glass et al. |
| 5,740,310 | A | 4/1998 | De Haan et al. |
| 5,757,869 | A * | 5/1998 | Sands et al. ............... 375/366 |
| 5,784,110 | A | 7/1998 | Acampora et al. |
| 5,784,631 | A | 7/1998 | Wise |
| 5,796,743 | A | 8/1998 | Bunting et al. |
| 5,835,144 | A | 11/1998 | Matsumura et al. |
| 5,844,867 | A | 12/1998 | De Haan et al. |
| 5,870,444 | A | 2/1999 | Mynett et al. |
| 5,898,897 | A | 4/1999 | Son et al. |
| 5,930,395 | A | 7/1999 | Nagai et al. |
| 5,946,043 | A | 8/1999 | Lee et al. |
| 5,955,977 | A * | 9/1999 | Lei ............................ 341/107 |
| 5,956,090 | A | 9/1999 | Yamauchi |
| 5,970,173 | A | 10/1999 | Lee et al. |
| 6,075,576 | A | 6/2000 | Tan et al. |
| 6,266,158 | B1 | 7/2001 | Hata et al. |
| 6,330,214 | B1 | 12/2001 | Ohta et al. |
| 6,470,034 | B1 * | 10/2002 | Tan ............................ 370/514 |
| 6,535,688 | B1 * | 3/2003 | Kawamura et al. ............ 386/95 |
| 6,597,740 | B2 | 7/2003 | Nakamura et al. |
| 6,873,629 | B2 | 3/2005 | Morris |
| 6,915,078 | B1 * | 7/2005 | Mazzurco .................... 398/50 |
| 7,149,247 | B2 * | 12/2006 | Sullivan ................ 375/240.01 |
| 7,248,740 | B2 * | 7/2007 | Sullivan ..................... 382/232 |
| 2001/0001023 | A1 | 5/2001 | Imahashi et al. |
| 2002/0035732 | A1 * | 3/2002 | Zetts .......................... 725/148 |
| 2003/0189954 | A1 * | 10/2003 | Miki et al. .................. 370/509 |

FOREIGN PATENT DOCUMENTS

| | | |
|---|---|---|
| EP | 0 948 214 A2 | 10/1999 |
| EP | 1 018 840 A2 | 7/2000 |
| EP | 1 043 892 A1 | 10/2000 |
| EP | 1 069 777 A1 | 1/2001 |
| EP | 1 079 631 A2 | 2/2001 |
| EP | 1 111 932 A2 | 6/2001 |
| JP | 10-126389 | 5/1998 |
| JP | 2000-032394 | 1/2000 |
| JP | 2001-345711 | 12/2001 |
| JP | 2002-099407 | 4/2002 |
| WO | WO 99/56472 | 11/1999 |
| WO | WO 00/56077 | 9/2000 |
| WO | WO 00/64186 | 10/2000 |

OTHER PUBLICATIONS

Anonymous, "DivX Multi Standard Video Encoder," 2 pp.
ISO/IEC, "ISO/IEC 13818-4: Information Technology—Generic Coding of Moving Pictures and Associated Audio Information—Part 4: Conformance testing," 79 pp. (1998).
Sullivan, "On Random Access and Bitstream Format for JVT Video," Joint Video Team (JVT) of ISO/IEC MPEG & ITU-T VCEG (ISO/IEC JTC1/SC29/WG11 and ITU-T SG16 Q.6), Document JVT-B063, 6 pp. (Jan.-Feb. 2002).
Sullivan et al., "The H.264/AVC Advanced Video Coding Standard: Overview and Introduction to the Fidelity Range Extensions," 21 pp. (Aug. 2004).
Wien, "Variable Block-Size Transforms for Hybrid Video Coding," Dissertation, 182 pp. (Feb. 2004).
U.S. Appl. No. 60/341,674, filed Dec. 17, 2001, Lee et al.
Reader, "History of MPEG Video Compression—Ver. 4.0," 99 pp. document marked Dec. 16, 2003.
Printouts of FTP directories from http://ftp3.itu.ch, 8 pp. (downloaded from the World Wide Web on Sep. 20, 2005).
Joint Video Team of ISO/IEC MPEG and ITU-T VCEG, "Study of Final Committee Draft of Joint Video Specification (ITU-T Rec. H.264, ISO/IEC 14496-10 AVC," 257 pp. (Document dated Dec. 2002) [Downloaded from the World Wide Web on May 6, 2005].
Joint Video Team of ISO/IEC MPEG and ITU-T VCEG, "Joint Model Number 1, Revision 1 (JM-1r1)," 80 pp. (Document dated Jan. 2002) [Downloaded from the World Wide Web on May 6, 2005].
ITU-T, "ITU-T Recommendation H.320: Infrastructure of Audiovisual Services—Systems and Terminal Equipment for Audiovisual Services: Narrow-band Visual Telephone Systems and Terminal Equipment," 31 pp. (1999).
ISO/IEC, "ISO/IEC 13818-2: Information Technology—Generic Coding of Moving Pictures and Associated Audio Information: Video—Amendment 1: Content Description Data," 23 pp. (Document dated Dec. 2001).
Suzuki et al., "Tool to Support Random Access," ITU-T, Study Group 16, Question 6, 3 pp. (Document dated Dec. 2001) [Downloaded from the World Wide Web on May 6, 2005].
Suzuki et al., "Group of Pictures for JVT Codec," ITU-T, Study Group 16, Question 6, 4 pp. (Document dated Jan. 2002) [Downloaded from the World Wide Web on May 6, 2005].
Suzuki, "AHG Report: GOP Syntax," ITU-T, Study Group 16, Question 6, 1 p. (Document dated Dec. 2002) [Downloaded from the World Wide Web on May 6, 2005].
Sullivan, "Header-Level Needs for H.26L," ITU-T, Study Group 16, Questions 15/16, 6 pp. (Dec. 2001).
Microsoft Corporation, "Microsoft Debuts New Windows Media Player 9 Series, Redefining Digital Media on the PC," 4 pp. (Sep. 4, 2002) [Downloaded from the World Wide Web on May 14, 2004].
Mook, "Next-Gen Windows Media Player Leaks to the Web," BetaNews, 17 pp. (Jul. 19, 2002) [Downloaded from the World Wide Web on Mar. 16, 2004].
ITU-T, "ITU-T Recommendation H.261: Video Codec for Audiovisual Services at $p \times 64$ kbits," 28 pp. (1993).
ITU-T, "ITU-T Recommendation H.262: Information Technology—Generic Coding of Moving Pictures and Associated Audio Information: Video!," 218 pp. (1995).
ITU-T, "ITU-T Recommendation H.263: Video Coding for Low Bit Rate Communication," 167 pp. (1998).
ISO/IEC, "ISO/IEC 11172-2: Information Technology—Coding of Moving Pictures and Associated Audio for Storage Media at up to About 1,5 Mbit/s," 122 pp. (1993).
ISO/IEC, "Information Technology—Coding of Audio-Visual Objects: Visual, ISO/IEC 14496-2, Committee Draft," 330 pp. (1998).
ISO/IEC, "ISO/IEC 13818-6: Information Technology—Generic Coding of Moving Pictures and Associated Audio Information—Part 6: Extensions for DSM-CC," pp. ii-9, 136-147, 204, 205, 222-224, 279-290, 311-318, 399-401 (1998).
ISO/IEC, "ISO/IEC 13818-1: Information Technology—Generic Coding of Moving Pictures and Associated Audio Information: Systems," 174 pp., (2000).
ISO/IEC, "ISO/IEC 13818-4: Information Technology—Generic Coding of Moving Pictures and Associated Audio Information—Part 4: Conformance testing," 79 pp. (1998).
ISO/IEC, "DSM-CC FAQ Version 1.0," 12 pp. (1997) [Downloaded from the World Wide Web on Nov. 12, 2004].
Lei, Shaw-Min, "The construction of efficient variable-length codes with clear synchronizing codewords for digital video applications," SPIE vol. 1605, Visual Communications and Image Processing '91: Visual Communication, Nov. 11, 1991, pp. 863-873.
Stockhammer, Thomas et al., "H.26L/JVT Coding Network Abstraction Layer and IP-Based Transport," Proceedings 2002 Intl'l. Conference on Image Processing, ICIP 2002, IEEE, Sep. 22-Sep. 25, 2002, pp. 485-488.
Miranda Technologies Inc., "Time Code Processor/TCP-101i: Guide to Installation and Operation," Nov. 1999, pp. 1-47, Canada.
Anderson, David B., "A Proposed Method for Creating VCR Functions using MPEG Streams," IEEE 1996, 1063-6383/96, pp. 380-382.
Williams, Richard, "All in Good Timecode. To edit video with precision with precision you need to understand the numbers," Adobe Magazine, Spring 1999, pp. 57-59.
Communication dated Jul. 21, 2005, from European Patent Office for European Patent Application No. 03 713 279.2, 5 pages.
Communication under Rule 51(4) EPC dated May 23, 2006, from European Patent Office for European Patent Application No. 03 713 279.2, 6 pages.
International Search Report dated Jul. 29, 2003, from International Application No. PCT/US03/02137, 4 pages.

Search Report dated Jan. 9, 2007, from European Patent Office for European Patent Application No. 06 021 437.6, 3 pages.

Communication dated Mar. 26, 2007, from European Patent Office for European Patent Application No. 06 021 437.6, 5 pages.

Communication dated May 23, 2008, from European Patent Office for European Patent Application No. 06 021 437.6, 4 pages.

* cited by examiner

METHODS AND SYSTEMS FOR START CODE EMULATION PREVENTION AND DATA STUFFING

RELATED APPLICATION

This application claims the benefit of U.S. Provisional Application No. 60/351,143, filed Jan. 22, 2002.

TECHNICAL FIELD

This invention relates to methods and systems for preventing start code emulation and for data stuffing.

BACKGROUND

Digital data is typically transmitted from some type of transmitter to some type of receiver. Transmitters typically include an encoder that encodes the data for transmission; and receivers typically include a decoder that decodes data that it receives. There are different types of digital data such as video data, audio data, audio/video data, text data, computer executable program data, archival data, database information, and the like. When digital data is transmitted, it is typically transmitted in some type of channel. Equivalently, computer, memory or any storage device or storage medium can be considered a transmission channel for purposes herein.

When digital data is transmitted, it is important to be able to find specific points within the data in the channel. This is done for various purposes, such as to locate points that enable recovery from errors or losses in the transmission of the data through the channel, points that enable starting the decoding process at a location other than the start of the entire stream, or points that enable searching for different types of data that are utilized for different purposes. Thus, for example, on the decoder side, decoders and other components that process digital data often need to know the context of the data so that the data can be properly processed. This would not be so important if one was able to start with the first bit that was sent and the decoder was able to run without any errors. In this situation, ideally, the decoder could simply track the information that was being sent according to knowing what the format of the data is. Unfortunately, this idealistic situation often does not occur. Errors and other contingencies do occur that present challenges to those who design and use systems that transmit and receive digital data. In some cases such as when tuning into an ongoing broadcast stream of data, the decoder cannot start at the beginning of the data transmission. Locating points by data format parsing may also require a significant amount of complex processing in a decoder.

In many types of channel environments, such issues are addressed by providing, in the data, so-called resynchronization markers. Resynchronization markers provide a mechanism by which a system can start its decoding process or recover from an error. For example, when digital data is streamed as a series of bits or bytes, having resynchronization markers in the stream can provide a decoder with a point of reference from which to recover in the event an error occurs in the transmission.

One way that resynchronization markers can be employed is in the context of start codes. A start code is a string of bits or bytes having a specific value. Generally, many systems tend to carry bytes (e.g. H.222.0/MPEG-2 Systems), so that start codes can be defined as a uniquely-valued string of bytes. The unique string of bytes provides a pattern the presence of which indicates a resynchronization point. A resynchronization point typically indicates the start or boundary of some independently decodable amount of data. For example, in H.262/MPEG-2 Video data, resynchronization points can indicate the start of a slice (i.e. an independently decodable region of a picture), the start of a picture, the start of a GOP (i.e., "Group of Pictures" or independently decodable sequence of pictures), or the start of a new video sequence. Digital video streams can also include so-called ancillary or supplemental data which can be preceded by a start code.

Sometimes, start codes are used not only within a data stream such as a video stream, but are used by a system's multiplex level. The H.222.0/MPEG-2 System specification is an example of a system that uses start codes, and carries streams of video data interleaved with system-level information and audio information.

Since start codes can be important insofar as providing resynchronization points within a data stream, it is a good idea to avoid emulating start codes in the data stream in places that are not, in fact, intended to represent start codes.

For example, consider the following. Start codes define a specific pattern of bits or bytes that can identify the start of a new unit of data. If one is sending arbitrary data in between the start codes, then it is possible that the arbitrary data may, in and of itself, contain the same pattern that one is using as a start code. For example, if one assumes that the data that is being carried is completely random, then if a start code is K bits long, the probability of accidentally emulating the start code in the bits starting at some particular bit location is $1/2^k$.

In some cases, the judgment can be made that if the number of bits in the start code is large, then it may be fairly unlikely for the start code to be accidentally emulated. This is the case with respect to some audio data formats. Typically, these formats do not utilize a very high bit rate measured in bits per second, so it is not too likely that a start code will be accidentally emulated during any particular interval of time. With respect to video data, this is generally not the case as video often requires a much higher bit rate.

In past major video coding standards (with perhaps one exception), the video syntax format within the data payload has been designed to avoid start code emulation. That is, if one knows what kind of data elements will make up the video syntax, then one can carefully design the syntax so that no accidental start codes can occur. For example, a start code in traditional video coding standards begins with a long string of 0-bits, followed by a 1-bit. This long string may contain 23 0-bits followed by one 1-bit. Assume that most of the data that is sent is entropy coded using variable length codes (often referred to informally as Huffman codes). Variable length codes (VLCs) are defined for example purposes herein as variable-depth tree-structured codes that are utilized to select among a set of represented symbols. One technique using binary-tree VLCs is to make sure that the path in the tree from the root to every leaf that represents a valid symbol always has a "1" in it somewhere, and that the tree structure is not too deep.

Thus, for example, if one knows that every variable length code string is no longer than 10 bits long and that every such string will have at least one 1-valued bit in it, then one knows that there is no way that a sequence of coded data from the VLC can ever contain more than 18 consecutive zero-valued bits. That is, the worst-case scenario would be 1000000000 followed by 0000000001. Thus, if one designs the syntax carefully and inspects the location of every 0- and every 1-valued bit to ascertain how many 0's can occur in a row, one can use a start code that contains a longer string of 0's than can ever occur in the syntax. For example, the syntax can be designed so that valid syntax can never contain 23 0's in a location that is not a start code. Thus, every occurrence of 23 0's should be a start code and the decoder should be able to accurately detect start codes.

While the above-described operation appears straightforward, the operation can be a fairly difficult undertaking because one has to inspect all of the possible data (at the bit level) that is going to be sent, in every possible order in which it is going to be sent to ensure that a start code pattern cannot accidentally be sent. This is an arduous method of syntax design that is prone to mistakes.

This bit-level inspection design process describes, generally, the way that many video coding specifications have been designed in the past (i.e. H.261, MPEG-1, H.262/MPEG-2, most of H.263, and MPEG-4). The one exception to this is Annex E of ITU-T Recommendation H.263 which uses a technique called arithmetic coding to generate compressed bits in an algorithmic fashion from a mathematical specification. Here, there is an extra process at the end of the entropy encoder which inspects the bits that are generated and, on the encoder side, if there are too many 0's in a row, a "marker" bit (a 1-bit) is inserted before a pre-determined number of 0's are encountered. On the decoder side, the decoder counts up the zeroes and if it encounters the critical number of zeroes, it knows that it has encountered a real start code. If the decoder sees one less zero than the critical number, it knows that the following 1 bit is a marker bit inserted to avoid start code emulation, discards that bit, and takes the following bits as the continuation of the real data.

The problem with this solution is that it makes the encoder and the decoder inspect and process the incoming data at the bit level. Analyzing and shifting the location of the data that is being processed by single bit positions becomes difficult and can undesirably tax the decoder. Bit-wise shifting is also a processor-intensive operation.

Accordingly, this invention arose out of concerns associated with providing improved methods and system for preventing start code emulation.

SUMMARY

Methods and systems are described to provide approaches to start code emulation prevention by operations performed at a granularity higher than the bit level. By operating at a level other than the bit level, processing efficiencies can be enhanced. In accordance with one or more embodiments, a start code emulation prevention method looks for data patterns relative to fixed-size data portions larger than single bits. When a particular pattern is found, start code emulation prevention data is inserted to prevent start code emulation. The inserted data is larger than a single bit and, in some embodiments, comprises a byte. When a decoder decodes data that has had start code emulation prevention data inserted, it can easily identify legitimate start codes and then can remove the start code emulation prevention data to provide the original data that was intended to be conveyed.

In addition, a data stuffing method is described which allows payload data to be rounded up in size to an integer number of byte sizes, and then allows filler data to be added in a manner which is easily detectable by a decoder.

DETAILED DESCRIPTION

Overview

The methods and systems described below provide approaches to start code emulation prevention at a granularity higher than the bit level. By operating at a level higher than the bit level, processing efficiencies can be enhanced. In the context of this document, operating at a level higher than the bit level is intended to refer to a process that looks for data patterns relative to fixed-size data portions larger than single bits. For example, fixed-size data portions can include bytes (i.e. 8 bits), "words" (i.e. 16 bits), "double-words" (32 bits) and the like. Thus, the inventive techniques can look for patterns within and among bytes, words, and the like.

In addition, a data stuffing method is described which allows payload data to be rounded up in size to an integer number of data unit sizes such as byte quantities, and allows filler data to be added in a manner which is easily detectable by a decoder.

In addition, while the examples provided below are discussed in the context of video data, it is to be appreciated and understood that the inventive techniques can be employed in connection with any type of data that is typically encoded and decoded and with which start code emulation prevention is desirable or necessary. Examples of such data include audio data, audio/video data, and the like.

Figure 1:
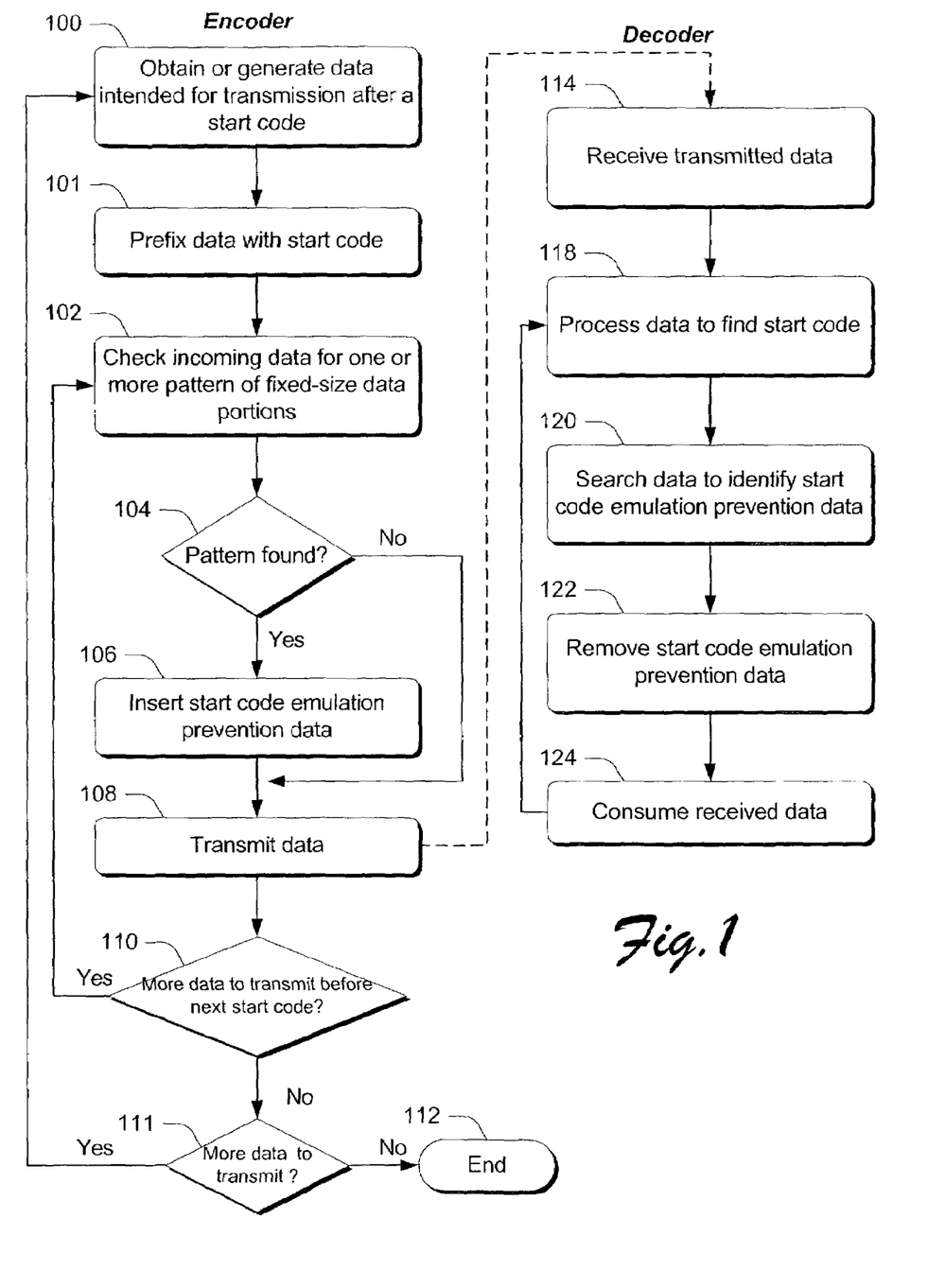
FIG. 1 is a flow diagram that describes steps in a method in accordance with one embodiment.

FIG. 1 is a flow diagram that describes steps in a method in accordance with one embodiment. The method can be implemented in any suitable hardware, software, firmware or combination thereof. In the illustrated and described embodiment, the method is implemented, at least in part in software. In addition, the reader will notice that the method is illustrated as having two different branches—one designated "Encoder" and one designated "Decoder". The "Encoder" branch illustrates steps that are carried out by or in connection with an encoder. Similarly, the "Decoder" branch illustrates steps that are carried out by or in connection with a decoder.

Step 100 obtains or generates a quantity of data that is intended for transmission after a start code. The data can comprise any suitable data. Examples of types of data include, without limitation, quantities of video data, audio data, audio/video data and the like. Step 101 prefixes the data with start codes. This step effectively adds start codes to the data that is obtained or generated in step 100. Step 102 checks or searches incoming data for one or more patterns of fixed-size data portions. In the illustrated and described embodiment, the pattern(s) that is(are) searched for comprise at least two fixed-size data portions and each individual data portion comprises at least two bits. Step 104 determines whether a pattern is found. If the pattern is not found, the method branches to step 108 where the data can be transmitted.

If, on the other hand, the pattern is found, step 106 inserts start code emulation prevention data relative to the data that contains the pattern. In the illustrated and described embodiment, individual instances of the start code emulation prevention data comprise more than one bit. Preferably, the start code emulation prevention data comprises an amount of data is that equal in number of bits to an individual fixed-size data portion. Thus, where a fixed-size data portion comprises 8 bits (a quantity of data referred to as a byte), the start code emulation prevention data comprises 8 bits. After the start code emulation prevention data is inserted, step 108 transmits the data. Step 110 determines whether there is additional data that is to be transmitted before the next start code. If there is, then the method returns to step 102 and proceeds as described above. If not, the method can determine, at step 111, whether there is additional data to transmit. If there is, the method branches back to step 100. If there is not, then the method can terminate at step 112.

As an aside, consider the following. Note that one example of use of this particular technology is to separate the start code into a "start code prefix" and a "start code type" suffix, where the prefix is a single unique string of values and the suffix indicates the type of data that follows the start code. In particular, this is the structure of MPEG-2 and H.264/AVC start codes and is the structure used in the section entitled "First Exemplary Method" below. An even more general form of use that encompasses the prefix/suffix structure as a special case, is the general notion of having one or more start code patterns. Then, one can also have one or more emulation prevention patterns. As long as the various start code patterns are distinct from the various emulation prevention patterns and all of these patterns are avoided in the processing of the payload data, the scheme will function accordingly. Additionally, one should not necessarily assume that the start code patterns are all the same length. This can be important in particular cases because, for example, H.264/AVC uses can be interpreted as using multi-length start codes.

On the decoder side, consider the following. Once the start code emulation prevention data has been inserted by the encoder, it can be identified and removed or ignored at some point for the proper interpretation of the other data. Consider also that as the decoder receives the transmitted data, it can look for the legitimate start codes. Once it finds the legitimate start codes, it knows where the start code-defined data boundaries are located. Now, the decoder can proceed to look for and remove the start code emulation prevention data so that it can further process the real data.

Specifically, step 114 receives transmitted data that has been processed by an encoder to prevent emulation of start codes. Step 118 processes the data to find the start code. Once the start code has been found and appropriately processed (e.g. read and discarded), step 120 searches the data to identify start code emulation prevention data. Once the start code emulation prevention data is found, step 122 removes the start code emulation prevention data. Once the start code emulation prevention data has been removed, the data can be processed in a manner that is typical for the type of data that has been received. For example, the data can be consumed by a consumer device, as in step 124.

First Exemplary Method

The method about to be described illustrates but one specific example of the method shown and described in FIG. 1. In the method about to be described, a byte of emulation prevention data is inserted whenever a string of N+1 bytes of payload data matches either the entire start code prefix, or matches the first N bytes of the start code prefix plus the value of the emulation prevention byte. This method adds data less frequently than the method described in the section entitled "Second Exemplary Method", and thus reduces the transmission capability requirements to send the payload data.

The MPEG-2 start code prefix structure starts at a byte-aligned position and has 23 0's followed by a 1. This start code prefix is set forth directly below:

00000000 00000000 00000001

This structure can be generalized as a pattern that comprises some number of bytes N that have the same value, followed by some other byte that has a different value. In MPEG-2, one can say that N=2, and the first two bytes are 0 (referred to below as "W"), and that the last byte is 1 (referred to below as "X"). Thus, the start code prefix has the following pattern:

WWX

After these three bytes, in MPEG-2, another byte follows and identifies which kind of start code it is. This following byte is referred to as "Y". Essentially then, the start code consists of a start code prefix WWX, followed by a byte Y that identifies the type of start code. The entire MPEG-2 start code can be represented as:

WWXY

The start code prefix (WWX) has a fixed value, while Y has a number of different values that indicate the type of start code (e.g. slice, picture, GOP, sequence, system, and the like).

In accordance with one embodiment, the data is processed looking for the pattern WWX. When the WWX pattern is found, start code emulation prevention data is inserted to prevent start code emulation. Here, the start code emulation prevention data comprises a byte Z that has a value that is distinct from the values of the W and X bytes. Thus, assume that the encoder is inspecting bytes of data and notices the pattern WWX. Responsive to finding this pattern in the data, the encoder inserts a byte having value Z to provide the following pattern:

WWZX

At this point, the encoder has ensured that the payload data that is to be transmitted and processed by the decoder does not accidentally emulate a start code or start code prefix. Now consider the following. Just as the payload data had a chance of emulating a start code prefix by arbitrarily containing the WWX pattern, the payload data also has a chance of arbitrarily emulating data that contains the start code emulation prevention data. That is, the payload data might inherently contain the pattern WWZX. If this is the case and the encoder were not to do anything, when the decoder attempts to remove the start code emulation prevention data, it will remove the Z byte which in this case is real data.

Accordingly, in the described embodiments, the encoder is configured to prevent not only the payload data from emulating start codes or start code prefixes, but the encoder is configured to prevent the data from emulating data patterns that result from the use of start code emulation prevention data. Specifically, in this example, if the encoder identifies the pattern WWZ, it inserts a byte having the value Z between the second W and the Z to provide the following pattern (the inserted byte Z is the first Z to appear below):

WWZZ

Now, consider the processed data from the perspective of the decoder. If the decoder sees any pattern of bytes that comprises WWZ followed by either a Z or X, it knows that the first Z is an emulation prevention byte that was inserted by the encoder. Accordingly, the decoder can discard the first Z. Thus, in this example, there are two situations when an emulation prevention byte can be inserted. The first situation is when the data would accidentally emulate a start code or start code prefix. The second situation is when the data would accidentally emulate data that has had an emulation prevention byte inserted.

In either case, the decoder can simply look for the appropriate pattern, discard the emulation prevention byte, and process the data as usual.

To illustrate the above processing in a more programmatic fashion, consider the following. On the encoder side, to send a packet P[ ] of B bytes, starting with a start code prefix which consists of N or more bytes of the same value W and a last byte of a different value X, followed by an identifying start code type suffix of 1 byte having the value Y, we operate the following pseudo code process which inserts emulation prevention bytes having the value Z (where W, X, Y, and Z have different values from each other, and P[B−1] is not equal to W), where the quantity of extra data to send to fill the channel is specified by E:

```
int B, N, E, i, j;
byte *P, W, X, Y, Z;
for(j=0; j<N+E; j++)    /* start code prefix (SCP) */
     send_byte( W );    /* jth byte of SCP */
send_byte( X );         /* last byte of SCP */
send_byte( Y );         /* start code type suffix */
for(i=j=0; i<B; i++)    {
    if(j >= N && (P[i] == X || P[i] == Z)) {
        send_byte( Z );
        j = 0;
    }
    send_byte( P[i] ); /* a byte of data payload */
    if (P [i] == W) j++;
    else            j = 0;
}
```

In the above pseudo-code, a function "send_byte( )" is assumed to operate the transmission of a unit of data (process 108 in FIG. 1).

On the decoder side, to receive the packet, assume that the decoder has already found, read, and discarded the known start code prefix which consists of N or more bytes of the same value W and a last byte of a different value X. Assume also that we wish to read the unknown single-byte start code type suffix into a variable Y and to read the packet of payload data into an array P[ ] and determine the amount of payload data and place the quantity indication in a variable B, while removing emulation prevention bytes having the value Z (where W, X, Y, and Z have different values from each other, and P[B−1] is not equal to W):

```
int B, N, j, next;
byte *P, W, X, Y, Z;
/* assume start code prefix was already read */
Y = receive_byte( ); /* start code type suffix */
for(B=j=0, next=0; more_data() && !next; B++) {
    P[B] = receive_byte( );
    if(j >= N) {
        if(P[B] == W)
            j++;
        else{
            j = 0;
            next = (P[B] == X);
            if(P[B] == Z)
                B--;
        }
    }else
        if(P[B] == W) j++;
        else          j=0;
}
if(next) /* another start code found */
    B -= j+1;
```

In the above pseudo-code, a function "receive_byte( )" is assumed to operate the reception of a unit of data and a function "more_data( )" is assumed to determine whether there are any more units of data to be received (these two functions comprising process 114 in FIG. 1).

The above-described method allows an arbitrary amount of W-value stuffing prior to the start code. Formulations are equally possible that fix the number of W-value prefixes to N.

Second Exemplary Method

The method about to be described illustrates but one other specific example of the method shown and described in FIG. 1. Here, the method inserts a byte of emulation prevention data whenever a string of N bytes of data in the payload matches the first N bytes of the start code prefix, regardless of the value of the subsequent payload data. Using the nomenclature of the above example, if the data contains the pattern "WW" followed by anything, the method inserts an emulation prevention byte. Accordingly, when the encoder identifies the pattern WW, it inserts an emulation prevention byte to provide the following pattern:

WWZ

The distinction between the first-described method and the one described immediately above is that the first method looks at the first N+1 bytes to ascertain where to insert an emulation prevention byte, whereas the method described immediately above looks at the first N bytes.

The first method reduces the quantity of extra data to be transmitted, while the method described immediately above operates using simpler rules. Thus, collectively both of the methods provide a choice between reducing the quantity of data transmitted and reducing rule complexity. With the first-described method, quantity of data is reduced relative to that of the second-described method. With the second-described method, simpler rules are utilized.

To illustrate the above processing in a more programmatic fashion, consider the following. On the encoder side, to send a packet P[ ] of B bytes, starting with a start code prefix which consists of exactly N bytes of the same value W and a last byte of a different value X, followed by an identifying start code type suffix of 1 byte having the value Y, we operate the following pseudo code process which inserts emulation prevention bytes having the value Z (where W, X, Y, and Z have different values from each other, and P[B−1] is not equal to W):

```
int B, N, i, j;
byte *P, W, X, Y, Z;
for(j=0; j<N; j++)      /* start code prefix (SCP) */
     send_byte( W );    /* jth byte of SCP */
send_byte( X );         /* last byte of SCP */
send_byte( Y );         /* start code type suffix */
for(i=j=0; i<B; i++)    {
    send_byte( P[i] ); /* a byte of data payload */
    if( P[i] != W )
        j=0;
    else
        if(++j == N) {
            send_byte ( Z );
            j = 0;
        }
}
```

In the above pseudo-code, a function "send_byte( )" is assumed to operate of the transmission of a unit of data (process 108 in FIG. 1).

On the decoder side, to receive the packet, assume that the decoder has already found, read, and discarded the known start code prefix which consists of exactly N bytes of the same value W and a last byte of a different value X, and that we wish to read the unknown single-byte start code type suffix into a variable Y and to read the packet of payload data into an array P[ ] and determine the amount of payload data and place the quantity indication in a variable B, while removing emulation prevention bytes having the value Z (where W, X, Y, and Z have different values from each other, and P[B−1] is not equal to W):

```
int B, N, j, k;
byte *P, W, X, Y, Z;
/* assume start code prefix was already read */
Y = receive_byte( ); /* start code type suffix */
for(B=j=0, k=Z; more_data() && k != X; B++) {
    P[B] = receive_byte( );
    if(P[B] == W) {
        if(++j == N) {
            k = receive_byte( ); /* more_data() always */
            if(k != Z && != X)
                declare_error( );
            j = 0;
        }
    }else
        j = 0;
}
if(k == X) /* another start code found */
    B -= N;
```

In the above pseudo-code, a function "receive_byte( )" is assumed to operate the reception of a unit of data and a function "more_data( )" is assumed to determine whether there are any more units of data to be received (these two functions comprising process 114 in FIG. 1).

It is believed that the above-described methods will expand the quantity of a large amount of ideal random input payload data by a factor of approximately $1/256^N$ for the second-described method and $1/256^{(N+1)}$ for the first-described method. These amounts are small if N is large (e.g., 2 or greater, noting that N=2 for MPEG-2 start codes). The worst-case expansion factor for the payload is believed to be 1/N for the second-described method and 1/(N+1) for the first-described method. If N is increased, the payload expansion factor is reduced in both statistical and worst-case analysis—although the quantity of data used by the start codes themselves is increased.

It should be appreciated that the above-described emulation prevention process does not depend on knowing how much data is in the packet before starting to send it. Thus it adds no significant delay.

This formulation of the second-described method assumes that the inserted emulation prevention bytes are single bytes having the value Z. It is possible instead to use any value or multiple values or one or more strings of values for the emulation prevention data, as long as the first byte of inserted data is not equal to W or X, which would emulate a valid start code or appear to be a continuation of the start of the prefix.

One can even carry information in these emulation prevention bytes (such as an H.263-style GOB frame ID/picture sequence number, for example, or perhaps to set just the MSB to '1' and use the other seven bits to send an ASCII character).

If one considers what happens at the end of the packet on the decoder side, we realize that it is easier to control the operation if the last byte of the data packet payload is not W. This means that the last byte sent before a start code will never need to be an emulation prevention byte and that a detectable boundary can be located by the decoder between the end of the payload data and the start of the sequence of bytes equal to W for the next start code. Forcing this to be the case can also allow one to stuff in any amount of W bytes (e.g., zero bytes) after the end of the payload and before the next start code without losing track of where the end of the payload is.

Data Stuffing

Normally, with video data, the data that is sent as the data payload may not be an integer number of bytes. For example, one may have 627 bits that are to be sent between two start codes. The system multiplex level may, however, operate in bytes. This is so for the MPEG-2 specification. Other reasons such as enabling the detection of some false start code patterns generated by transmission errors or enabling simple decoding processes for the data contents of the beginning of the payload may also justify a desire for a packet to contain an integer number of data units such as bytes. Thus, one may have to send a little more data in order to carry the 627 bits of data. The question then becomes how to pad out the data to make it an integer number of bytes.

There are other situations when it would be useful to simply send extra filler data. For example, if a channel has a capacity of 1 Megabit/sec and the quantity of payload data to be sent is only 900 kbits/sec, one may need or want to fill up the channel with filler data.

In accordance with one embodiment, a data stuffing technique enables extra data to be added to the channel to, in essence, pad the payload data.

Figure 2:
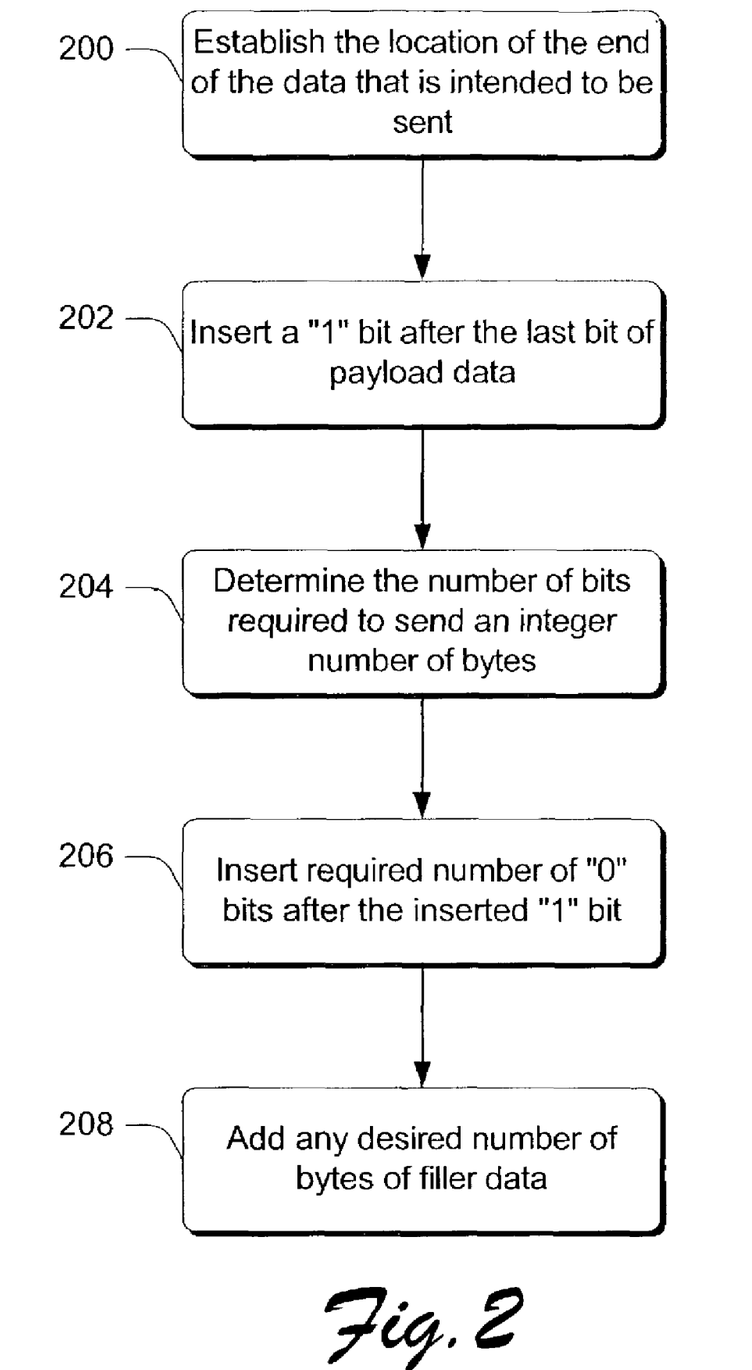
FIG. 2 is a flow diagram that describes steps in a method in accordance with one embodiment.

FIG. 2 is a flow diagram that describes steps in a data stuffing method in accordance with one embodiment in which the start codes are assumed to begin with a string of bits equal to zero. Step 200 establishes the location of the end of the data that is intended to be sent. Step 202 inserts a "1" bit after the last bit of payload data. Step 204 determines the number of additional bits required to send an integer number of bytes. Step 206 inserts the required number of "0" bits after the inserted "1" bit. Step 208 adds any desired number of bytes of filler data. The filler data may consist of any data patterns designed to avoid confusion over the locations of the true payload data and of the intentional start codes. This is typically implemented by inserting bytes of value "0".

As an example, consider the following. Assume that 627 bits are to be sent. Here, step 202 would insert a "1" bit after the $627^{th}$ bit. Step 204 would then determine that four more bits are required to provide an integer number of bytes—here, 79 bytes. Accordingly, step 206 would insert four "0"bits or 0000 after the inserted "1" bit. Now, having established an integer number of bytes, step 208 can, if so desired, add any desired number of bytes of filler data. In this particular example, bytes having a value of 0 can be inserted. The filler data can be used simply as filler data, or for some other purpose such as containing information that a decoder can use for some purpose.

Now, consider the situation at the decoder. The decoder receives the stuffed data and can start at the end of the data and look backwards through the data. All of the bytes that the decoder initially sees will be the 0 bytes until it gets to the byte with the "1" bit. The "1" bit tells the decoder the location of the end of the payload or real data. Thus, once the decoder finds the "1" bit that was inserted, it can determine exactly where the real data ends.

Thus, the techniques described above can be used to "round up" the number of bits that are sent so that the number of bits that are sent comprise an integer number of data units. Additionally, these techniques can be used to stuff filler data in between start codes that designate the start of payload data.

Exemplary Computing Environment

Figure 3:
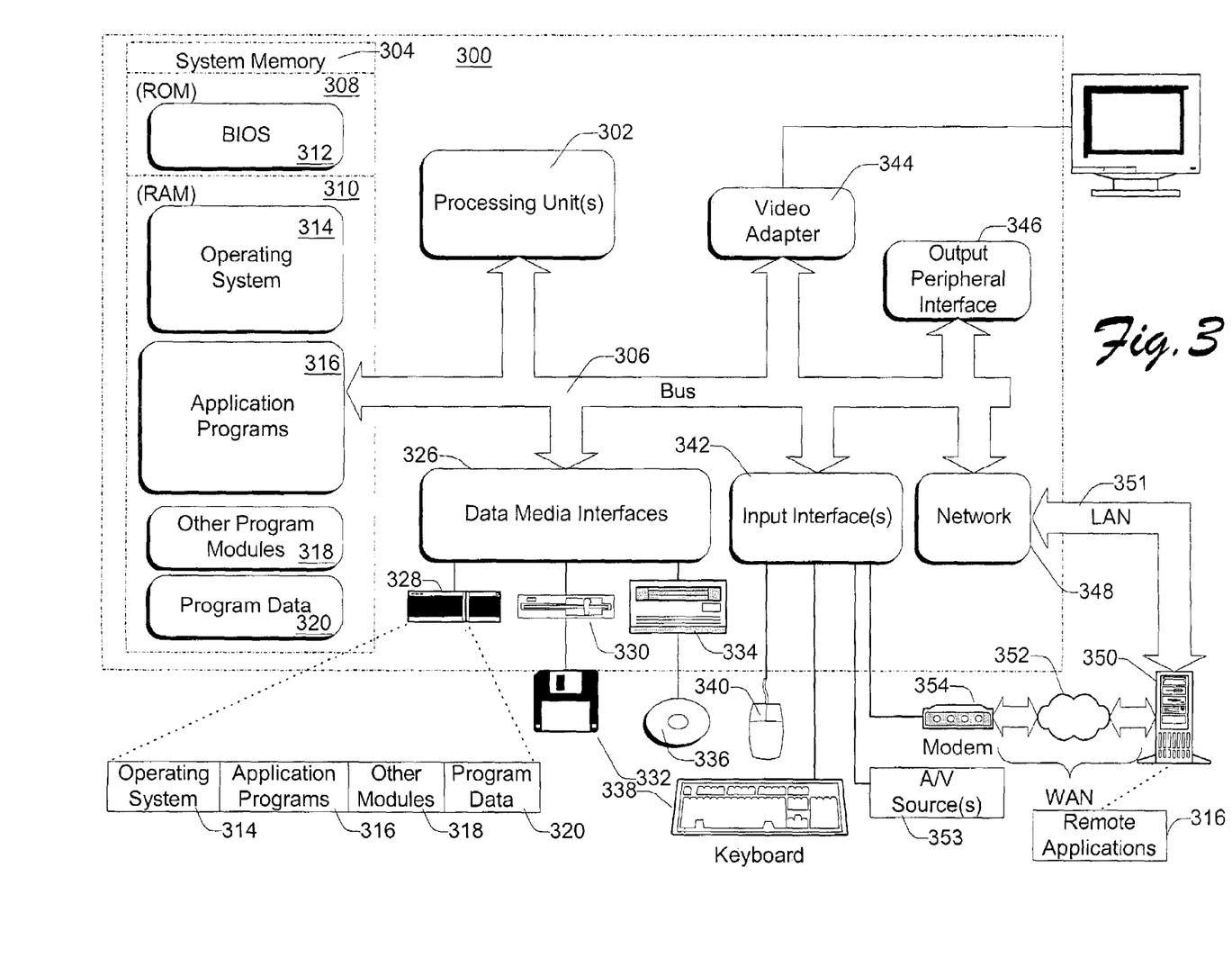
FIG. 3 is a high level diagram of a computing environment in connection with which one or more embodiments can be implemented.

FIG. 3 illustrates an example of a suitable computing environment 300 on which the system and related methods described below can be implemented.

It is to be appreciated that computing environment 300 is only one example of a suitable computing environment and is not intended to suggest any limitation as to the scope of use or functionality of the encoding/decoding system described above. Neither should the computing environment 300 be interpreted as having any dependency or requirement relating to any one or combination of components illustrated in the exemplary computing environment 300.

The various described embodiments can be operational with numerous other general purpose or special purpose computing system environments or configurations. Examples of well known computing systems, environments, and/or configurations that may be suitable for use with the media processing system include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

In certain implementations, the system and related methods may well be described in the general context of computer-executable instructions, such as program modules, being executed by a computer. Generally, program modules include routines, programs, objects, components, data structures, etc. that perform particular tasks or implement particular abstract data types. The embodiments can also be practiced in distributed computing environments where tasks are performed by remote processing devices that are linked through a communications network. In a distributed computing environment, program modules may be located in both local and remote computer storage media including memory storage devices. Components of the described computing system can be used to implement an encoder and a decoder that functions as described above.

In accordance with the illustrated example embodiment of FIG. 3, computing system 300 is shown comprising one or more processors or processing units 302, a system memory 304, and a bus 306 that couples various system components including the system memory 304 to the processor 302.

Bus 306 is intended to represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 300 typically includes a variety of computer readable media. Such media may be any available media that is locally and/or remotely accessible by computer 300, and it includes both volatile and non-volatile media, removable and non-removable media.

In FIG. 3, the system memory 304 includes computer readable media in the form of volatile, such as random access memory (RAM) 310, and/or non-volatile memory, such as read only memory (ROM) 308. A basic input/output system (BIOS) 312, containing the basic routines that help to transfer information between elements within computer 300, such as during start-up, is stored in ROM 308. RAM 310 typically contains data and/or program modules that are immediately accessible to and/or presently be operated on by processing unit(s) 302.

Computer 300 may further include other removable/non-removable, volatile/non-volatile computer storage media. By way of example only, FIG. 3 illustrates a hard disk drive 328 for reading from and writing to a non-removable, non-volatile magnetic media (not shown and typically called a "hard drive"), a magnetic disk drive 330 for reading from and writing to a removable, non-volatile magnetic disk 332 (e.g., a "floppy disk"), and an optical disk drive 334 for reading from or writing to a removable, non-volatile optical disk 336 such as a CD-ROM, DVD-ROM or other optical media. The hard disk drive 328, magnetic disk drive 330, and optical disk drive 334 are each connected to bus 306 by one or more interfaces 326.

The drives and their associated computer-readable media provide nonvolatile storage of computer readable instructions, data structures, program modules, and other data for computer 300. Although the exemplary environment described herein employs a hard disk 328, a removable magnetic disk 332 and a removable optical disk 336, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk 328, magnetic disk 332, optical disk 336, ROM 308, or RAM 310, including, by way of example, and not limitation, an operating system 314, one or more application programs 316 (e.g., multimedia application program 324), other program modules 318, and program data 320. A user may enter commands and information into computer 300 through input devices such as keyboard 338 and pointing device 340 (such as a "mouse"). Other input devices may include a audio/video input device(s) 353, a microphone, joystick, game pad, satellite dish, serial port, scanner, or the like (not shown). These and other input devices are connected to the processing unit(s) 302 through input interface(s) 342 that is coupled to bus 306, but may be connected by other interface and bus structures, such as a parallel port, game port, or a universal serial bus (USB).

A monitor 356 or other type of display device is also connected to bus 306 via an interface, such as a video adapter or video/graphics card 344. In addition to the monitor, personal computers typically include other peripheral output devices (not shown), such as speakers and printers, which may be connected through output peripheral interface 346.

Computer 300 may operate in a networked environment using logical connections to one or more remote computers, such as a remote computer 350. Remote computer 350 may include many or all of the elements and features described herein relative to computer.

As shown in FIG. 3, computing system 300 is communicatively coupled to remote devices (e.g., remote computer 350) through a local area network (LAN) 351 and a general wide area network (WAN) 352. Such networking environments are commonplace in offices, enterprise-wide computer networks, intranets, and the Internet.

When used in a LAN networking environment, the computer 300 is connected to LAN 351 through a suitable network interface or adapter 348. When used in a WAN networking environment, the computer 300 typically includes a modem 354 or other means for establishing communications over the WAN 352. The modem 354, which may be internal or external, may be connected to the system bus 306 via the user input interface 342, or other appropriate mechanism.

In a networked environment, program modules depicted relative to the personal computer 300, or portions thereof, may be stored in a remote memory storage device. By way of example, and not limitation, FIG. 3 illustrates remote application programs 316 as residing on a memory device of remote computer 350. It will be appreciated that the network connections shown and described are exemplary and other means of establishing a communications link between the computers may be used.

Conclusion

Some of the above described methods and systems can provide for start code emulation prevention at a level of processing that is other than the bit level. This is advantageous because it can ease processing complexities. The techniques described in this document can be employed in any suitable context, e.g. in connection with payload containing content created by variable length codes, Huffman codes and arithmetic coding. Additionally, some embodiments provide a straightforward method for data stuffing that can ensure that an integer number of bytes are sent when desired and that can allow for the sending of additional filler data in addition to the data for the start codes, emulation prevention patterns, and basic payload data.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method comprising:
    obtaining encoded data in a data stream, wherein a first start code precedes the encoded data in the data stream, and wherein a second start code or end of the data stream follows the encoded data in the data stream; and
    for the encoded data between the first start code and the second start code or end of the data stream, inserting emulation prevention bytes as needed in the encoded data to prevent start code emulation, including:
        searching for a first pattern of multiple bytes throughout the encoded data, the first pattern of multiple bytes comprising at least part of a start code prefix comprising multiple bytes; and
        responsive to finding the first pattern of multiple bytes within the encoded data, replacing the first pattern with a replacement pattern in the encoded data, the replacement pattern comprising the multiple bytes in the first pattern along with an emulation prevention byte for preventing start code emulation.

2. The method of claim 1, wherein the encoded data comprises video data.

3. The method of claim 1, wherein the encoded data comprises audio data.

4. The method of claim 1, wherein the encoded data comprises audio/video data.

5. The method of claim 1, wherein the first pattern comprises at least three bytes.

6. The method of claim 5, wherein the at least three bytes comprises:
    at least two bytes each equal to zero; and
    a third byte in which each of the third byte's six most-significant bits is 0.

7. The method of claim 1, wherein the emulation prevention byte is equal to 0x03.

8. The method of claim 1, wherein the first pattern comprises a complete start code prefix.

9. The method of claim 1, wherein the start code prefix consists of two bytes each equal to 0x00 followed immediately by a byte equal to 0x01.

10. The method of claim 1, wherein the replacing the first pattern with the replacement pattern prevents emulation of the start code prefix.

11. The method of claim 1 wherein the searching includes byte comparisons between bytes of the encoded data and the multiple bytes of the first pattern.

12. A method comprising:
    receiving encoded data in a data stream, wherein a first start code precedes the received encoded data in the data stream, and wherein a second start code or end of the data stream follows the received encoded data in the data stream;
    locating the first start code within the data stream; and
    before decoding the received encoded data between the first start code and the second start code or end of the data stream, removing any start code emulation prevention bytes in the received encoded data between the first start code and the second start code or end of the data stream, including:
        searching for a pattern of plural bytes throughout the received encoded data, the pattern comprising:
            at least one byte of a multiple-byte start code prefix; and
            a start code emulation prevention byte for preventing start code emulation; and
        responsive to finding the pattern in the received encoded data, removing the start code emulation prevention byte of the pattern from the received encoded data.

13. The method of claim 12, wherein the data stream comprises video data.

14. The method of claim 12, wherein the data stream comprises audio data.

15. The method of claim 12, wherein the at least one byte of the multiple-byte start code prefix comprises two bytes each equal to zero.

16. The method of claim 12, wherein the start code emulation prevention byte is equal to 0x03.

17. The method of claim 12, wherein the locating the first start code comprises locating a start code prefix of the first start code.

18. The method of claim 17, wherein the locating the start code prefix of the first start code comprises searching for a string of plural consecutive 0s in the data stream.

19. The method of claim 17, wherein the locating the start code prefix of the first start code comprises searching for a string of plural consecutive 0s followed immediately by a 1 in the data stream.

20. The method of claim 19, wherein the string of plural consecutive 0s consists of 31 0s.

21. The method of claim 12 wherein the searching includes byte comparisons between bytes of the received encoded data and the multiple bytes of the pattern.

22. A method comprising:
    obtaining encoded video data in a data stream, wherein a first start code precedes the encoded video data in the data stream, and wherein a second start code or end of the data stream follows the encoded video data in the data stream; and
    for the encoded video data between the first start code and the second start code or end of the data stream, inserting emulation prevention bytes as needed in the encoded video data to prevent start code emulation, including:
        searching for a first pattern of bytes throughout the encoded video data, the first pattern of bytes comprising plural bytes equal to at least part of a start code prefix comprising plural bytes; and
        if the first pattern is found in the encoded video data, replacing the first pattern with a replacement pattern in the encoded video data, the replacement pattern comprising the first pattern of bytes along with an emulation prevention byte for preventing start code emulation.

23. The method of claim 22, wherein the first pattern comprises at least three bytes and wherein the start code prefix comprises at least three bytes.

24. The method of claim 22, wherein the first pattern comprises:
   at least two bytes each equal to zero; and
   a third byte in which each of the third byte's six most-significant bits is 0.

25. The method of claim 22, wherein the emulation prevention byte is equal to 0x03.

26. The method of claim 22, wherein the start code prefix consists of two bytes each equal to 0x00 followed immediately by a byte equal to 0x01.

27. The method of claim 22, wherein the replacing the first pattern with the replacement pattern prevents emulation of the start code prefix.

28. The method of claim 22, wherein the replacement pattern consists of the first pattern and the emulation prevention byte inserted between two bytes of the first pattern.

29. A method comprising:
   receiving encoded video data in a data stream, wherein a first start code precedes the received encoded video data in the data stream, and wherein a second start code or end of the data stream follows the received encoded video data in the data stream;
   locating the first start code within the data stream; and
   before decoding the received encoded video data between the first start code and the second start code or end of the data stream, removing any start code emulation prevention bytes in the received encoded video data between the first start code and the second start code or end of the data stream, including:
      searching for a pattern of plural bytes throughout the received encoded video data, the pattern of plural bytes comprising:
         bytes equal to first two bytes of a start code prefix comprising more than two bytes; and
         a start code emulation prevention byte for preventing start code emulation; and
      if the pattern of plural bytes is found in the received encoded video data, removing the start code emulation prevention byte of the pattern from the received encoded video data.

30. The method of claim 29, wherein the bytes equal to the first two bytes of the start code prefix are each equal to zero.

31. The method of claim 29, wherein the start code emulation prevention byte is equal to 0x03.

32. The method of claim 29, wherein the start code prefix comprises a string of plural consecutive 0s followed immediately by a 1.

33. The method of claim 32, wherein the string of plural consecutive 0s consists of 23 0s.

34. One or more storage media having stored thereon computer executable instructions for causing one or more computers to perform a method comprising:
   obtaining encoded data in a data stream, wherein a first start code precedes the encoded data in the data stream, and wherein a second start code or end of the data stream follows the encoded data in the data stream; and
   for the encoded data between the first start code and the second start code or end of the data stream, inserting emulation prevention bytes as needed in the encoded data to prevent start code emulation, including:
      searching for a first pattern of multiple bytes throughout the encoded data, the first pattern of multiple bytes comprising at least part of a start code prefix comprising multiple bytes; and
      responsive to finding the first pattern of multiple bytes within the encoded data, replacing the first pattern with a replacement pattern in the encoded data, the replacement pattern comprising the multiple bytes in the first pattern along with an emulation prevention byte for preventing start code emulation.

35. One or more storage media having stored thereon computer executable instructions for causing one or more computers to perform a method comprising:
   receiving encoded data in a data stream, wherein a first start code precedes the received encoded data in the data stream, and wherein a second start code or end of the data stream follows the received encoded data in the data stream;
   locating the first start code within the data stream; and
   before decoding the received encoded data between the first start code and the second start code or end of the data stream, removing any start code emulation prevention bytes in the received encoded data between the first start code and the second start code or end of the data stream, including:
      searching for a pattern of plural bytes throughout the received encoded data, the pattern comprising:
         at least one byte of a multiple-byte start code prefix; and
         a start code emulation prevention byte for preventing start code emulation; and
      responsive to finding the pattern in the received encoded data, removing the start code emulation prevention byte of the pattern from the received encoded data.

36. One or more storage media having stored thereon computer executable instructions for causing one or more computers to perform a method comprising:
   obtaining encoded video data in a data stream, wherein a first start code precedes the encoded video data in the data stream, and wherein a second start code or end of the data stream follows the encoded video data in the data stream; and
   for the encoded video data between the first start code and the second start code or end of the data stream, inserting emulation prevention bytes as needed in the encoded video data to prevent start code emulation, including:
      searching for a first pattern of bytes throughout the encoded video data, the first pattern of bytes comprising plural bytes equal to at least part of a start code prefix comprising plural bytes; and
      if the first pattern is found in the encoded video data, replacing the first pattern with a replacement pattern in the encoded video data the replacement pattern comprising the first pattern of bytes along with an emulation prevention byte for preventing start code emulation.

37. One or more storage media having stored thereon computer executable instructions for causing one or more computers to perform a method comprising:
   receiving encoded video data in a data stream, wherein a first start code precedes the received encoded video data in the data stream, and wherein a second start code or end of the data stream follows the received encoded video data in the data stream;
   locating the first start code within the data stream; and
   before decoding the received encoded video data between the first start code and the second start code or end of the data stream, removing any start code emulation prevention bytes in the received encoded video data between the first start code and the second start code or end of the data stream, including:
searching for a pattern of plural bytes throughout the received encoded video data, the pattern of plural bytes comprising:
  bytes equal to first two bytes of a start code prefix comprising more than two bytes; and a start code eumulation prevention byte for preventing start code emulation; and if the pattern of plural bytes is found in the received encoded video data, removing the start code emulation prevention byte of the pattern from the received encoded video data.

\* \* \* \* \*

UNITED STATES PATENT AND TRADEMARK OFFICE
CERTIFICATE OF CORRECTION

PATENT NO.        : 7,505,485 B2                                Page 1 of 1
APPLICATION NO.   : 10/350273
DATED             : March 17, 2009
INVENTOR(S)       : Gary J. Sullivan et al.

It is certified that error appears in the above-identified patent and that said Letters Patent is hereby corrected as shown below:

In column 14, line 65, in Claim 22, delete "data ," and insert -- data, --, therefor.

In column 16, line 25, in Claim 35, delete "including;" and insert -- including: --, therefor.

In column 16, line 53, in Claim 36, delete "data" and insert -- data, --, therefor.

In column 18, line 1, in Claim 37, delete "eumulation" and insert -- emulation --, therefor.

Signed and Sealed this
Twelfth Day of July, 2011

David J. Kappos
*Director of the United States Patent and Trademark Office*